United States Patent [19]

Adachi et al.

[11] Patent Number: 4,676,593
[45] Date of Patent: Jun. 30, 1987

[54] EYEPIECE AND PHOTOGRAPHING DEVICE FOR FIBERSCOPE

[75] Inventors: Rensuke Adachi; Tadashi Takahashi, both of Tokyo, Japan

[73] Assignee: Asahi Kogaku Kogyo Kabushiki Kaisha, Tokyo, Japan

[21] Appl. No.: 601,468

[22] Filed: Apr. 18, 1984

[30] Foreign Application Priority Data

| Apr. 18, 1983 | [JP] | Japan | 58-68072 |
| Apr. 18, 1983 | [JP] | Japan | 58-68073 |
| Apr. 18, 1983 | [JP] | Japan | 58-57764[U] |
| Apr. 18, 1983 | [JP] | Japan | 58-57765[U] |

[51] Int. Cl.$^4$ ............................................. G02B 23/26
[52] U.S. Cl. ............................ 350/96.26; 350/96.10; 350/96.25; 350/311; 350/404; 350/407; 350/500
[58] Field of Search .............. 350/96.10, 96.24, 96.25, 350/96.26, 411, 409, 401, 500, 404, 311, 407

[56] References Cited

U.S. PATENT DOCUMENTS

| 3,110,762 | 11/1963 | Frank | 350/96.25 X |
| 3,399,591 | 9/1968 | Drougard et al. | 350/404 X |
| 3,449,037 | 6/1969 | Koester | 350/96.25 |
| 3,897,136 | 7/1975 | Bryngdahl | 350/407 |
| 4,074,306 | 2/1978 | Kakinuma et al. | 350/96.26 X |
| 4,227,208 | 10/1980 | Takanashi et al. | 350/404 X |
| 4,341,442 | 7/1982 | Johnson | 350/311 X |
| 4,378,952 | 4/1983 | Siegmund | 350/96.25 |

FOREIGN PATENT DOCUMENTS

| 0064899 | 11/1982 | European Pat. Off. | 350/96.25 |
| 0094676 | 11/1983 | European Pat. Off. | 350/401 |
| 52-66449 | 6/1977 | Japan | 350/404 |
| 55-74512 | 6/1980 | Japan | 350/311 |
| 56-137313 | 10/1981 | Japan | 350/96.25 |
| 0377714 | 7/1973 | U.S.S.R. | 350/411 |

Primary Examiner—John Lee
Attorney, Agent, or Firm—Sughrue, Mion, Zinn, Macpeak, and Seas

[57] ABSTRACT

In an eyepiece or photographing device for a fiberscope having a bundle of optical fibers for image transmission and an eyepiece or photographing optical system for observing or photographing the exit end face of the bundle, an optical monocrystalline plate having a double refraction characteristic is disposed to obtain separate images from the images at the ends of the various fibers. The result is an image in which high frequency spatial interference, such as moire fringing, is eliminated. The monocrystalline plate may further be provided with a low-pass filter characteristic.

21 Claims, 25 Drawing Figures

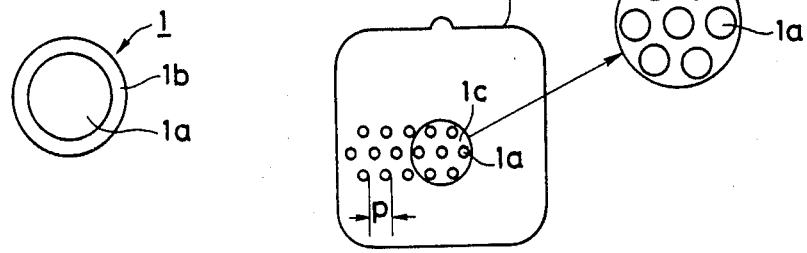
FIG. 1 PRIOR ART
FIG. 2 PRIOR ART
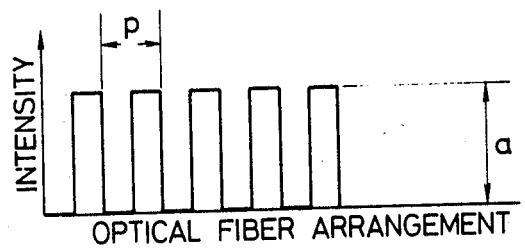
FIG. 3 PRIOR ART
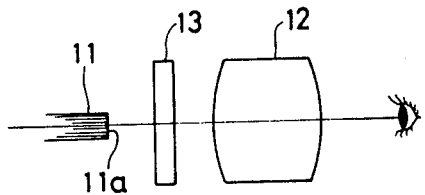
FIG. 4
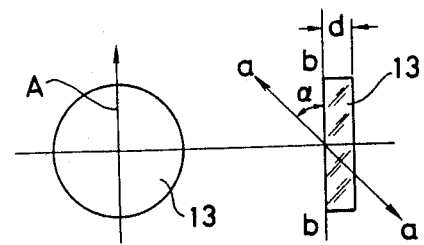
FIG. 5A  FIG. 5B

EYEPIECE AND PHOTOGRAPHING DEVICE FOR FIBERSCOPE

BACKGROUND OF THE INVENTION

The present invention relates to a fiberscope device such as an endscope or the like, and more particularly, to a eyepiece for such a device.

A fiberscope, as is well known in the art, includes a bundle of many optical fibers each having a diameter of the order of microns, an objective lens at the front end of the bundle, and an eyepiece lens at the rear end. An image of the object being observed is formed on the entrance end face of the optical fiber bundle at the front end thereof and passes through the fiber bundle to the exit end face at the rear end thereof where the image is observed through the eyepiece lens. Each of the optical fibers forming the optical fiber bundle, as shown in FIG. 1, has a core $1a$ for transmitting light, and a cladding $1b$ surrounding the core $1a$ which transmits substantially no light. When a number of optical fibers 1 are bundled by applying adhesive to the claddings, the cores $1a$ are arranged at intervals p as shown in the enlarged diagram of FIG. 2. That is, the cores $1a$ are separated from one another, and a dark region $1c$ is formed between the cores $1a$. When the exit end face of the optical fiber bundle is observed through the eyepiece lens, the presence of the regularly arranged cores $1a$ and the dark region $1c$ results in fixed-pattern optical noise, as a result of which the image cannot be clearly observed. In FIG. 2, reference numeral 2 designates the field-of-vision frame of the eyepiece device.

FIG. 3 shows an optical intensity distribution formed by the cores $1a$ and the dark region $1c$. In the optical intensity distribution, parts corresponding to the cores $1a$ have a certain optical intensity, and parts corresponding to the dark region $1c$ are zero in optical intensity. The optical intensity difference between the core $1a$ and the dark region $1c$ is a. The optical intensity distribution over the image under observation, that is, the arrangement pattern noise of the cores $1a$ and the dark region $1c$ superimposed on the object's image, lowers the apparent resolving power and is a factor causing eye fatigue in the observer. Furthermore, in a still photographing operation, the resolving power is apparently lowered significantly because the image is at rest. On the other hand, in a television photographing operation, interference occurs between the optical fiber bundle and the color separating filter of the television image pickup tube or television scanning lines causing a moire pattern interference in the reproduced image, thus making it difficult to observe the image clearly under certain conditions. The same moire pattern is observed when a shared observation type telescope is coupled to the fiberscope Many efforts have been made to solve the above-described problems. The conventional approaches are directed to a reduction of the diameter of the individual optical fiber 1 or the thickness of the cladding $1b$. However, since the amount of reduction of the diameter of the optical fibers or the cladding thickness is limited, problems remain.

In order to prevent the formation of such a moire pattern, a comb-type filter or a trap circuit has been provided in the television image pickup section or in the television image receiver section. However, this method is extremely ineffective in preventing the formation of the moire pattern in an apparatus such as an endscope having a special arrangement pattern.

SUMMARY OF THE INVENTION

In accordance with the invention, the pattern of the cores and claddings of the optical fibers is made inconspicuous by providing an optical monocrystalline plate having a double refraction characteristic to obtain separate images from the core of each optical fiber.

Further, in accordance with the invention, based on the fact that an optical monocrystalline plate having a double refraction characteristic yields a plurality of separate images from an optical fiber core's image under observation, two double-refraction optical monocrystalline plates are provided piled one on another. The two optical monocrystalline plates are turned together and/or relative to each other to control the directions of image separation so as to detect, while observing the image through the eyepiece, the angular positions of the optical monocrystalline plates where the image is least affected by the core arrangement pattern noise and accordingly has a high resolution.

Another specific feature of the invention resides in that, according to the finding that the above-described difficulty accompanying the conventional device is due to the fact that the high frequency components of the spatial frequency components of the image of the core of each optical fiber being reproduced by the eyepiece lens are conspicuous, an optical low-pass filter is used to remove the high frequency components of the image of the core of each optical fiber and to make the intensity distribution of the image in the core arrangement direction substantially sinusoidal with light from a uniform diffusion surface applied to the objective lens.

BRIEF DESCRIPTION OF THE DRAWINGS

FIG. 1 is an enlarged view of the end face of an optical fiber;

FIG. 2 is an explanatory diagram showing an enlarged image of the eyepiece lens of a conventional fiberscope;

FIG. 3 is a graphical representation of the optical intensity distribution of an image to be observed with optical fibers;

FIG. 4 is an explanatory diagram showing the arrangement of an eyepiece device constructed according to the invention;

FIGS. 5A and 5B are, respectively, a front view and a rightside view of an optical monocrystalline plate having a double refraction characteristic showing the inclination of its optical axis and the direction of image separation;

DESCRIPTION OF THE PREFERRED EMBODIMENTS

Figure 6A:
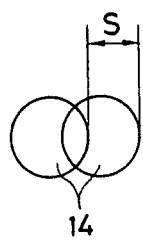
FIGS. 6A and 6B are, respectively, a plan view and a graphical representation showing separate images and the optical intensity distribution thereof.

The invention will be described with reference to preferred embodiments shown in the drawings.

FIG. 4 shows the fundamental arrangement of an eyepiece device according to the invention. In FIG. 4, reference numeral 11 designates an optical fiber bundle (only the rear end portion being shown), and 12, an eyepiece lens confronting the exit end face 11a of the optical fiber bundle 11. An optical monocrystalline plate 13 having a double refraction characteristic, the provision of which is one of the specific features of the invention, is inserted in the eyepiece optical system. In FIG. 4, the plate 13 is positioned between the exit end face 11a and the eyepiece lens 12. However, the plate 13 may be inserted in the eyepiece lens (group) 12 if desired. The front end portion of the optical fiber bundle 11 is confronted with the objective lens as described before so that the image to be observed is directed through the optical fiber bundle 11 to the exit end face 11a.

Because the optical monocrystalline plate 13 has a double refraction characteristic, the image applied thereto is divided. An optical crystal having this characteristic is called "a uniaxial crystal". Typical examples of uniaxial crystals are calcite, rock crystal, tourmaline and ice. Rock crystal is best in view of price, machinability and weather resistance. The optical monocrystalline plate 13 is formed by cutting the rock crystal in such a manner that, as shown in FIG. 5B, the angle α between the optical axis a—a and the incidence plane b—b is 45°±15°, preferably 44°50'. In the case where the angle α is orientated as shown in FIGS. 5A and 5B, an image applied to the optical monocrystalline plate 13 is separated in the direction of the arrow A when passing through the plate 13, thus providing two equal images. In general, the amount of image separation (S) of the uniaxial crystal is:

$$S = d \times \frac{(N_2^2 - N_1^2)\tan\alpha}{N_2^2 \tan^2\alpha + N_1^2},$$

where d is the thickness of the plate 13, $N_1$ is the refractive index of an ordinary light beam, and $N_2$ is the refractive index of an extraordinary light beam. This equation has the maximum value at α=44°50' of $S=5.9 \times d \times 10^{-3}$ (mm). According to the above-described equation and experiments, it has been found that the amount of image separation (S) with α=45°±15° is sufficient for the invention.

Figure 6B:
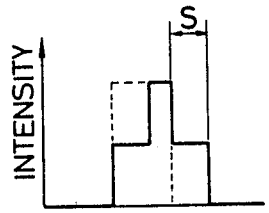

FIG. 6A shows the separate images 14 which are provided by the monocrystalline plate 13. The brightness of each of the two separate images 14 is half of the brightness of the original image. Accordingly, the optical intensity distribution has a high optical intensity part corresponding to the overlapping of the two separate images, and the remaining part of the optical intensity which is half of that of the high optical intensity part, as shown in FIG. 6B.

Figure 7:
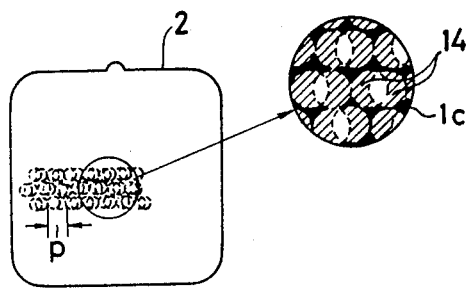
FIG. 7 is an explanatory diagram showing an example of an image observed with the eyepiece device of the invention.
Figure 8:
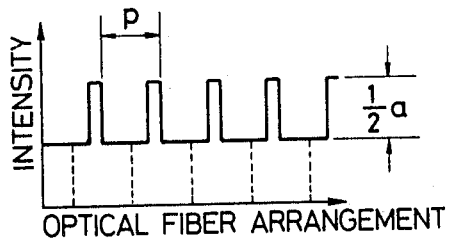
FIG. 8 is a graphical representation showing the optical intensity distribution of the image of FIG. 7.

If the thickness d of the plate 13 and the angle α between the optical axis a—a and the incident surface b—b are set to suitable values, then the separate images 14 can be aligned with the adjacent cores 1a of the optical fiber bundle 1. FIGS. 7 and 8 show one example of this. In the example, the difference between the maximum intensity and the minimum intensity is ½a (where a is the difference between the maximum intensity and the minimum intensity in the conventional device), and no dark region is formed in the horizontal direction, as a result of which the optical fiber core arrangement pattern, which otherwise is optically noisy, becomes inconspicuous. In addition, in the optical intensity distribution, the difference between the maximum intensity and the minimum intensity is reduced as described above. Thus, the observer can observe the image with ease over long periods.

In the above-described embodiment, the core arrangement noise in one direction, for instance in the horizontal direction, can be reduced as is apparent from FIG. 7; however, the dark region in the vertical direction cannot be eliminated. In order to eliminate the dark region in the vertical direction also, two or three optical monocrystalline plates 13 should be arranged in the direction of the incident optical axis so that separate images are provided in a plurality of directions.

Figure 9A:
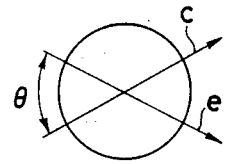
FIGS. 9A and 9B are, respectively, a front view and a rightside view of another embodiment of the invention.
Figure 9B:
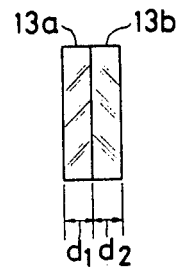
Figure 10:
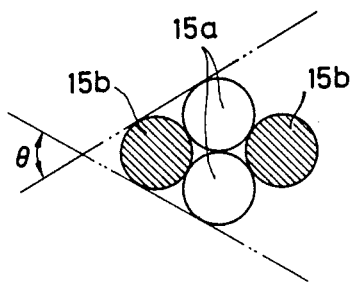
FIG. 10 is an explanatory diagram showing separate images provided in the embodiment of FIGS. 9A and 9B.

FIGS. 9A, 9B and 10 show another embodiment of the invention in which two optical monocrystalline plates are employed. The direction of image separation of the optical monocrystalline plate 13a is indicated by the arrow c, and the direction of image separation of the optical monocrystalline plate 13b by the arrow e. Satisfactory results can be obtained by setting the angle θ between the two directions to 30° to 70°, or 120° to 160°, preferably 60°. In this embodiment, four separate images are obtained. In the case where the angle θ is 60°, the brightness of two separate images 15b located outside is one-third of that of the remaining two separate images 15a. Accordingly, if the angle θ and the thicknesses $d_1$ and $d_2$ of the optical monocrystalline plates 13a and 13b are set to suitable values, the separate cores 1a are made to overlap the latter. Thus, the resultant image is ideal for observation with the dark region 1c completely complemented. When $d_1=d_2$, and $\theta=45°$ (or 135°), the brightness of the images 15a is equal to that of the images 15b. When $d_1=d_2$, and $\theta=55°$, the brightness of the images 15b is a half of that of the images 15a.

Figure 11:
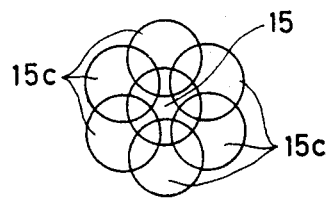
FIG. 11 is a plan view showing separate images provided by a third embodiment of the invention.

FIG. 11 shows separate images provided according to a third embodiment of the invention in which three optical monocrystalline plates 13 are employed. In this embodiment, the directions of image separation of the three plates 13 are arranged at angular intervals of 60° so that six separate images 15c are formed around the original image 15. It may be considered that the core arrangement pattern noise can be more effectively reduced by increasing the number of optical monocrystalline plates 13. However, even if more than three optical monocrystalline plates are used, the effect is not so different. Therefore, in practice, two or three optical monocrystalline plates should be employed with the effect and cost taken into consideration.

Figure 12:
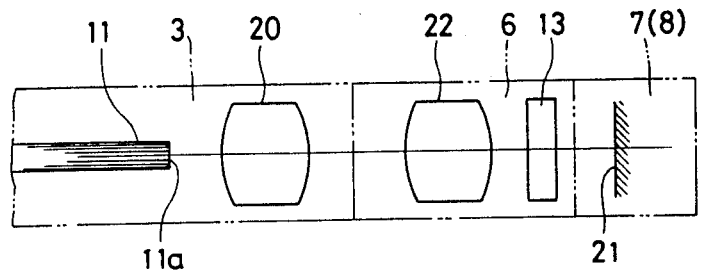
FIG. 12 is an optical system diagram showing the arrangement of a photographing device constructed in accordance with the invention, including the eyepice device and a camera body coupled to the photographing device.

FIG. 12 shows an application of the invention to a photographic device 6. The arrangement includes an eyepiece device 3 and a camera body 7 (or 8) coupled to the photographic device 6. In FIG. 12, reference numeral 11 designates an optical fiber bundle extended into the eyepiece device 3; 20, an eyepiece lens confronted with the exit end face 11a of the optical fiber bundle 11; and 21, a film plane (or a television image pickup plane) in the camera body 7 (or 8) (hereinafter referred to as "a focal plane", when applicable). A photographic lens 22 for forming on the focal plane 21 an image observed through the eyepiece device 3, and an optical monocrystalline plate 13 having a double refraction characteristic are provided in the photographing device 6. In FIG. 12, the plate 13 is disposed behind the photographic lens 22; however, it may be arranged in front of the lens or it may be included in the lens. In the embodiment shown in FIG. 12, the photographic device 6 is detachably coupled to the camera body 7 (or 8) and the eyepiece device; however, the device 6 may be so designed that it is integral with the camera body.

Figure 13:
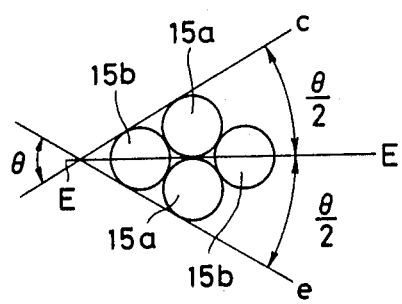
FIG. 13 is a plan view for a description of the bisector of an angle formed between image separation directions of two double-refraction optical monocrystalline plates.
Figure 14:
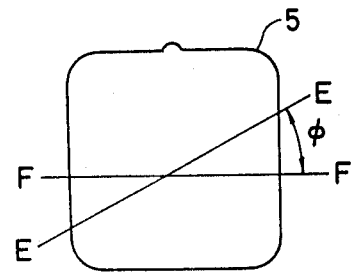
FIG. 14 is a plan view used for a description of the angle formed between the bisector and the horizontal line of the field-of-vision frame of the eyepiece device.
Figure 15:
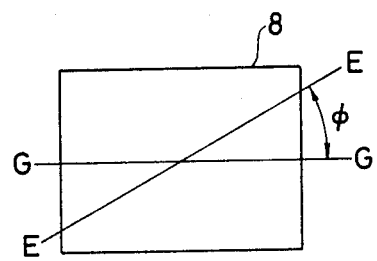
FIG. 15 is a plan view for a description of the angle formed between the bisector and the horizontal scanning direction of a television camera.

FIGS. 13, 14 and 15 show another embodiment of the invention which is suitable for providing television pictures with the television camera 8. As was described before, a trap circuit or comb-type filter is employed in an ordinary television system in order to prevent the formation of a moire pattern; however, that method is not so effective in eliminating the noise which is caused by the pattern of the cores of an endoscope.

In accordance with the embodiment of the invention, the bisector E—E of the angle $\theta$ which is formed between the image separation directions c and e of two double refraction optical monocrystalline plates 13a and 13b laid one on another in the direction of the optical axis of the photographing optical system forms a certain angle $\Phi$ with the horizontal line F—F of the field-of-vision frame 5 of the eyepiece device 3 or the horizontal scanning direction G—G of the television camera 8. When the image transmitting optical fiber bundle arrangement and the television horizontal scanning direction are taken into consideration, most satisfactory results are obtained with $\Phi=60°$ (or 120°). However, it has been found through experiments that, with $\Phi=22.5°$ to 90°, television pictures can be obtained which are higher in resolving power than those provided when the conventional photographic adapter is used. The reason why the bisector E—E formed the angle $\Phi$ with the horizontal line F—F of the field-of-vision frame 5 is that small television cameras recently developed are not turnable about the fiberscope because they are small in size, and therefore the horizontal scanning direction of the television camera 8 is generally held horizontal with the horizontal line F—F of the field-of-vision frame 5.

In accordance with another aspect of the present invention, the plate 13 in FIG. 14 is additionally provided with a low-pass characteristic.

Figure 16:
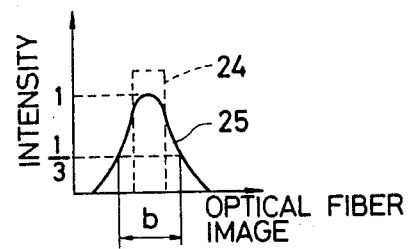
FIG. 16 is a graphical representation showing an example of the characteristic curve of an optical low-pass filter employed in the eyepiece device of the invention.

The characteristic curve of the plate 13 should be as shown in FIG. 16. That is, when the optical intensity distribution of the image by the core 1a of the optical fiber 1 is in the form of a square wave as indicated by the broken line in FIG. 16, it is smoothed into a cone-shaped intensity distribution 25 as indicated by the solid line in FIG. 16 when the image passes through the plate 13.

The cone-shaped intensity distribution 25 has two features with respect to the square-wave-shaped intensity distribution 24. One of the features is that the maximum value of the coned-shaped intensity distribution 25 is smaller than that of the square-wave intensity distribution 24. The other is that the image with the intensity distribution 25 is wider than that with the intensity distribution 24. In FIG. 16, reference character b designates the width of the image where the intensity is one-third of the maximum value. The width b is so determined to be less than three times the interval (p) of arrangement of the cores 11a. If the width b is larger than three times the interval of arrangement of the cores, then data transmitted by each core spreads over to the adjacent cores; that is, the fiberscope's resolving power is lowered.

Figure 17:
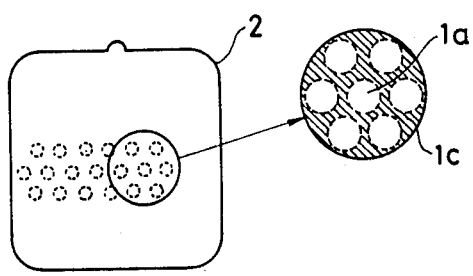
FIG. 17 is a plan view schematically showing an example of an image observed in an embodiment of the invention employing a low-pass optical filter.
Figure 18:
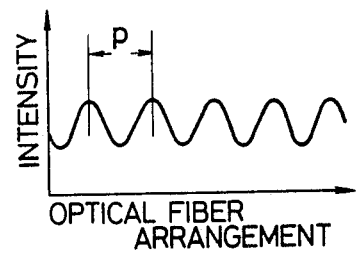
FIG. 18 is a graphical representation indicating the optical intensity distribution of the image observed with the device of the invention.

FIG. 17 is an explanatory diagram showing the exit end face 11a of the optical fiber bundle 11 viewed through the plate 13, and FIG. 18 is a graphical representation indicating the intensity distribution thereof. As is apparent from FIG. 17, the cone-shaped optical intensity distribution provided by the optical low-pass filter going in the dark region 1c connects the square-like intensity distribution into the sine-wave-like intensity distribution. That is, the cone-shaped intensity distributions of the images of adjacent cores overlap one another, which makes the pattern of the cores 1a inconspicuous.

A variety of optical low-pass filters have been known in the art; however, the following filters can be employed:

(1) Phase Difference Type Low-Pass Filter

The filter is fabricated as follows: Small circles are formed at random on a filter plate, for instance, by vacuum deposition in such a manner that the sum of the areas of these circles is half the pupil area.

(2) Amplitude Type Low-Pass Filter

The filter is such that the high frequency components of a Fourier transformation image by a lens are cut with a filter which is prepared by cutting holes on a metal plate or the like as required.

(3) Compound Prism Type Low-Pass Filter

The filter uses a compound prism which divides the lens pupil into several parts so that the image is formed at different positions by the parts.

(4) Double-Refraction Type Low-Pass Filter

The double refraction of a uniaxial crystal is utilized to divide the lens pupil into a plurality of parts so that a plurality of images are obtained.

That is, the eyepiece device of the invention can use any optical low-pass filter so long as it can remove the high frequency components of the image of the core of each optical fiber and make the optical intensity distribution of the image of the adjacent core to be substantially sinusoidal. When an image under observation is not uniform in brightness, the optical intensity distribution of the image reflects the nonuniformity of brightness. However, it should be noted that the aforementioned sinusoidal intensity distribution is obtained when a uniform diffusion surface is observed. Accordingly, it is obvious that, in practice, the optical intensity distribution of the image is of a sine wave which is affected by variations in brightness of the image under observation.

Figure 19:
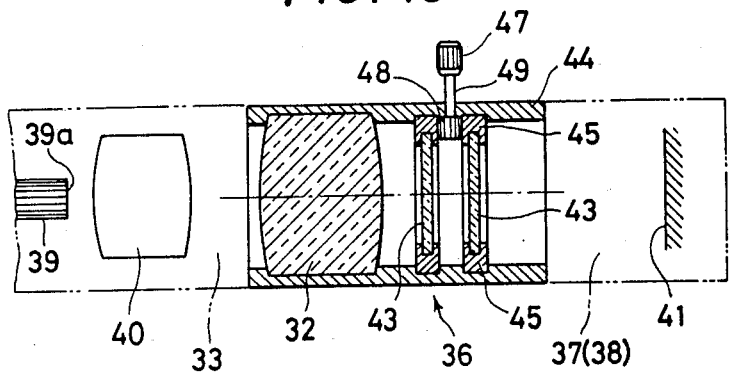
FIG. 19 is an optical system diagram in cross section showing the arrangement of another embodiment of a photographing device constructed in accordance with the invention.

FIG. 19 shows the fundamental arrangement of a photographic device 36 according to the invention, and an eyepiece device 33 and a camera body 37 (or 38) coupled to the photographic device 33. In FIG. 19, reference numeral 39 designates an optical fiber bundle extended into the eyepiece device 33; 40, an eyepiece lens confronted with the exit end face 39a of the optical fiber bundle 39; and 41, a film plane (or a television image pickup plane) in the camera body 37 (or 38) (hereinafter referred to as "a focal plane", when applicable). A photographic lens 32 for forming on the focal plane 41 an image observed through the eyepiece device 33, and two optical monocrystalline plates 43 having a double refraction characteristic are provided in the photographing device 36. The two optical monocrystalline plates 43 should be arranged in the eyepiece optical system in such a manner that they are piled in the direction of the optical axis of the photographic optical system. In FIG. 19, the plates 43 are arranged behind the photographic lens 32; however, they may be arranged in front of the photographic lens 32 or they may be included in the photographic lens. In addition, the plates 43 may be positioned apart from each other. In the embodiment shown in FIG. 19, the photographic device 36 is detachably coupled to the camera body 37 (or 38) and the eyepiece device 33; however, the device 36 may be so designed that it is integral with the camera body.

Figure 20:
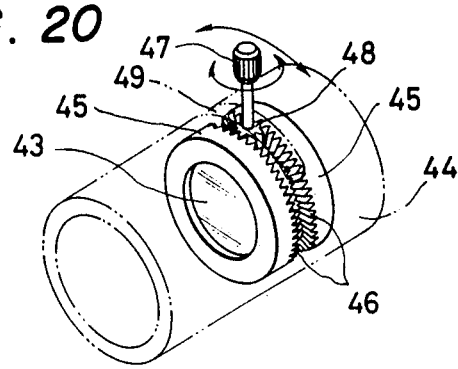
FIG. 20 is a perspective view showing the essential components of the system of FIG. 19.

The two optical monocrystalline plates 43 are fixedly secured to annular crystal plate supports 45, respectively, which are rotatably arranged in an adapter casing 44, as shown in FIG. 20. Sets of teeth 46 are cut in the annular parts of the supports 45 which confront each other. A pinion 48 is rotatably supported by the casing 44 and is inserted between the two supports 45 in such a manner that it is engaged with the teeth 46. The pinion 48 is movable along a circumferentially extended groove 49 formed in the casing 44. As the pinion 48 is turned with a knob 47 or moved along the groove 49, the directions of the optical axes of the two optical monocrystalline plates 43 are changed with respect to each other, or with respect to the casing 44, so that the directions of image separation thereof are changed. Accordingly, if the image passed through the optical monocrystalline plates 43 is observed through the viewfinder of the camera 37 (or 38) while changing the directions of the optical axes of the optical monocrystalline plates, the position where the arrangement pattern noise of the cores of the optical fibers is most inconspicuous and the position where no moire pattern is formed in the television photographic operation can be detected. Therefore, the above-described difficulties accompanying the conventional device can be eliminated by taking still pictures or television pictures at these positions of the optical monocrystalline plates 43.

Figure 21:
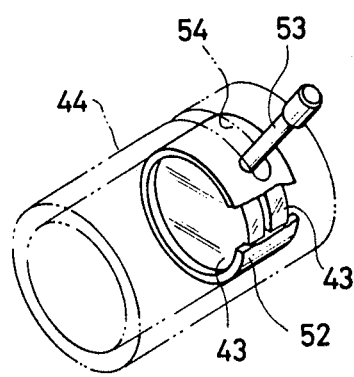
FIGS. 21 and 22 are perspective views, with parts cutaway, showing still further embodiments of photographing devices constructed in accordance with the invention.
Figure 22:
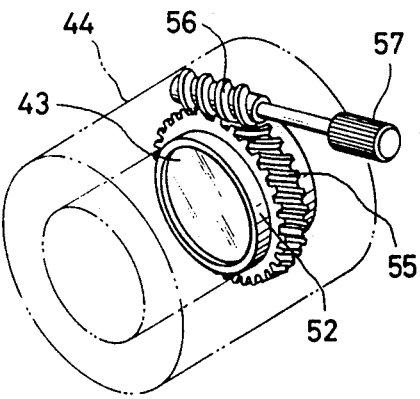

In the above-described embodiment, the two optical monocrystalline plates 43 can be turned together or with respect to each other. However, in the case where the photographing device is used with the premise that no television photographing operation is carried out, it is unnecessary to turn the two optical monocrystalline plates 43 together. Furthermore, in general, the arrangement pattern of the cores of the optical fibers is predetermined, and therefore it is possible to fix the directions of image separation of the two optical monocrystalline plates 43, as shown in FIGS. 21 and 22. The two monocrystalline plates 43 are fixedly secured to one crystal plate support 52 so that they cannot turn relative to each other. In the case of FIG. 21, a rod 53 is radially extended from the support 52 so that it protrudes through a circumferentially elongated groove 54 cut in the casing 44. In the case of FIG. 22, a gear 55 is formed on the outer wall of the support 52, and it is engaged with a worm gear 56 which is rotatably supported by the casing 44. Turning the operating rod 53 circumferentially (FIG. 21) or rotating the worm gear 56 with the knob 57 controls the angle $\Phi$ which is formed between the bisector E—E and the horizontal scanning line direction G—G.

As is apparent from the above description, the eyepiece device for a fiberscope according to the invention uses optical monocrystalline plates having the double refraction characteristic so that the image of the cores of each optical fiber can be observed by separating it over the dark region between the cores. Therefore, noise due to the core arrangement pattern is reduced. Accordingly, the impression that the image is being observed through bundled optical fibers is eliminated, which allows the observer to observe the image with ease for long periods, and increases the apparent resolving power. The improvement of the apparent resolving power is significant especially in the case of the image of a picture which is recorded as a still picture. When an image to be observed is photographed with a television camera or observed through a shared observation type telescope, the eyepiece device of the invention eliminates interference occurring between the core arrangement pattern and the color separating filter of the image pickup tube or the scanning lines. Therefore, the television picture or the image to be observed provided by the invention is excellent, being free from moire pattern effects.

We claim:

1. In an eyepiece device for a fiberscope having a bundle of optical fibers for image transmission and an eyepiece optical system for observing the exit end face of said bundle, the improvement wherein: an optical monocrystalline plate having a double refraction characteristic to obtain separate images from an image to be observed which is formed on the core of each optical fiber is disposed in said eyepiece optical system.

2. The eyepiece device as claimed in claim 1, in which said separate images provided by said optical monocrystalline plate at least partially overlap a dark region between said optical fiber cores.

3. The eyepiece device as claimed in claim 1, in which said optical monocrystalline plate is a monocrystalline plate of rock crystal, and the optical axis of said plate forms an angle of 45°±15° with the optical incident surface of said plate.

4. The eyepiece device as claimed in claim 1, in which two double refraction optical monocrystalline plates piled one on another are arranged in a direction of optical incident axis in such a manner that the directions of image separation thereof form an angle of 30° to 70°.

5. The eyepiece device as claimed in claim 1, in which three double refraction optical monocrystalline plates piled one on another are arranged in a direction of an optical incident axis in such a manner that the directions of image separation thereof are arranged at angular intervals of 60°.

6. The eyepiece device as claimed in claim 1, in which two double refraction optical monocrystalline plates piled one on another are arranged in a direction of optical incident axis in such a manner that the directions of image separation thereof form an angle of 120° to 160°.

7. In a photographing device for a fiberscope, which is interposed between an eyepiece device for observing the exit end face of an image transmitting optical fiber bundle and a camera for photographing an image which is observed through said eyepiece device, the improvement wherein an optical monocrystalline plate having a double refraction characteristic to obtain separate images from an image to be observed which is formed on the core of each optical fiber is arranged therein.

8. The photographing device as claimed in claim 7, in which said optical monocrystalline plate is a monocrystalline plate of rock crystal, and the optical axis of said plate forms an angle of 45°±15° with the optical incident surface of said plate.

9. The photographing device as claimed in claim 7, in which two double refraction optical monocrystalline plates piled one on another are arranged in the direction of the optical axis of said photographing device in such a manner that the directions of image separation thereof form an angle of 30° to 70°.

10. The photographing device as claimed in claim 9, in which said two double-refraction optical monocrystalline plates are positioned in such a manner that the bisector of an angle which is formed between the directions of image separation of said optical monocrystalline plates forms an angle of from 22.5° to 90° with a scanning direction when said photographing device is coupled to said eyepiece device.

11. The photographing device as claimed in claim 9, in which said two double-refraction optical monocrystalline plates are positioned in such a manner that the bisector of an angle which is formed between the directions of image separation of said optical monocrystalline plates forms an angle of from 22.5° to 90° with a horizontal scanning direction of a television camera when said photographing device is coupled to said television camera.

12. The photographing device as claimed in claim 7, in which two double refraction optical monocrystalline plates piled one on another are arranged in the direction of the optical axis of said photographing device in such a manner that the directions of image separation thereof form an angle of 120° to 160°.

13. The photographing device as claimed in claim 12, in which said two double-refraction optical monocrystalline plates are positioned in such a manner that the bisector of an angle which is formed between the directions of image separation of said optical monocrystalline plates forms an angle of from 22.5° to 90° with a scanning direction when said photographing device is coupled to said eyepiece device.

14. The photographing device as claimed in claim 13, in which said scanning direction is a horizontal scanning direction of a television camera.

15. In an eyepiece device in a fiberscope, the improvement wherein: an optical low-pass filter is disposed in an eyepiece optical system including a bundle of image transmitting optical fibers, said optical low-pass filter being adapted to remove high frequency components from the spatial frequency components of an image of the core of each optical fiber which is formed by said eyepiece optical system, and to cause the intensity distribution of arranged images provided by the cores of said optical fibers to be subtantially sinusoidal.

16. The eyepiece device as claimed in claim 15, wherein said filter comprises a filter having a double refraction characteristic.

17. In a photographing device of a fiberscope, which is interposed between an eyepiece device for observing the exit end face of an image transmitting optical fiber bundle and a camera for photographing an image which is observed through said eyepiece device, the improvement wherein: two optical monocrystalline plates having a double refraction characteristic for obtaining separate images from an image to be observed which is formed at the core of each optical fiber are arranged therein in such a manner that said two optical monocrystalline plates are piled one on another in the direction of the optical axis of a photographing optical system and are rotatable about the optical axis of said photographing optical system.

18. The photographing device as claimed in claim 17, in which said two optical monocrystalline plates are fixedly secured to an annular crystal plate support in such a manner that said two optical monocrystalline plates are not rotatable relative to each other, and a gear is formed on the cylindrical wall of said annular crystalline plate support, and is rotatably supported by an adapter casing.

19. The photographing device as claimed in claim 17, in which said two optical monocrystalline plates are fixedly secured to an annular crystal plate support in such a manner that said optical monocrystalline plates are not rotatable relative to each other, and an operating rod extending radially from said annular crystal plate support extends out of an adapter casing through a circumferentially elongated groove formed therein to turn said two optical monocrystalline plates.

20. The photographing device as claimed in claim 17, in which means for turning said two optical monocrystalline plates is provided comprising: first means for turning said two optical monocrystalline plates together; and second means for turning said two optical monocrystalline plates relative to each other.

21. The photographing device as claimed in claim 20, in which said second means comprises: two crystal plate supports supporting a respective one of said two optical monocrystalline plates, and being rotatably supported by an adapter casing; teeth formed on the annular parts of said two crystal plate supports which are confronted with each other; and a gear rotatably supported by said adapter casing in such a manner that said gear is engaged with said teeth to turn said two crystal plate supports in opposite directions when rotated, and said first means comprises: guide means for moving said gear along a circumferentially elongated groove in said adapter casing without turning said gear.

* * * * *